Sept. 26, 1961    E. MAURO ET AL    3,001,321
MOTORIZED BUG CATCHING DEVICE
Filed July 7, 1959
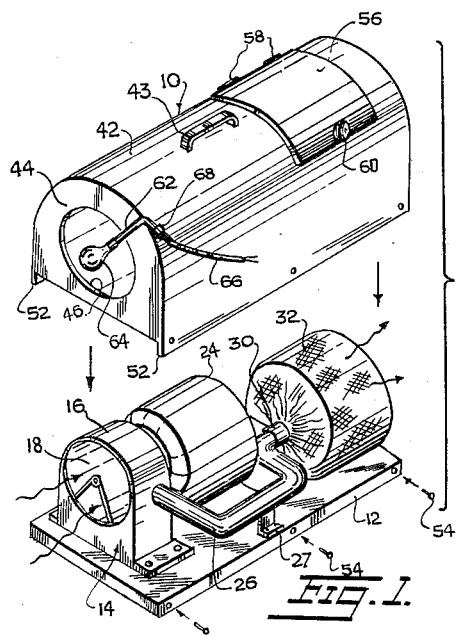
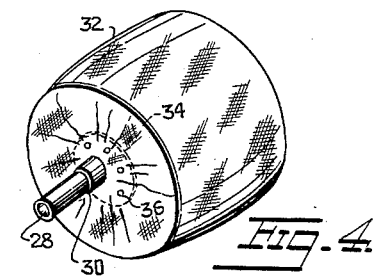
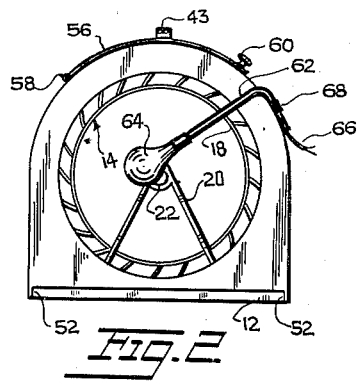
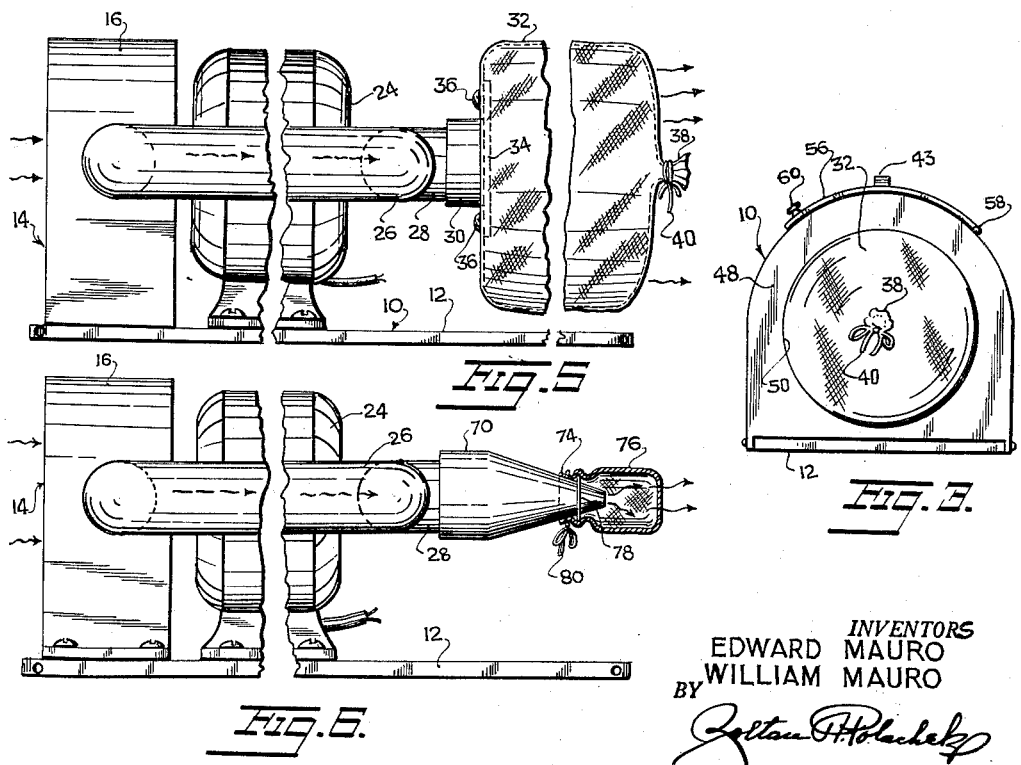
INVENTORS
EDWARD MAURO
WILLIAM MAURO
BY
ATTORNEY

3,001,321
MOTORIZED BUG CATCHING DEVICE
Edward Mauro, 1961 78th St., and William Mauro, 1072 E. 93rd St., both of Brooklyn, N.Y.
Filed July 7, 1959, Ser. No. 825,526
1 Claim. (Cl. 43—139)

This invention relates to traps or catchers for insects such as moths, mosquitos, etc. More particularly, the invention has reference to a device of this nature that includes a lamp bulb to attract the insects, a blower arranged to suck the attracted insects into a conduit, and an air-pervious container into which the insects will be drawn after passage through the conduit.

The main object of the invention is to provide a generally improved device of the character described.

A more particular object is to form the device in such a manner that it can be readily carried from place to place, for use wherever desired.

Another object is to incorporate the apparatus in an attractive casing that will conceal to the maximum extent the nature of the apparatus and the working parts thereof.

A further object is to facilitate disposal of the insects after they are trapped by the provision of a removable, readily cleaned container.

Still another object is to provide an improved arrangement of the several working parts so designed that the insects will not lodge against the same and will not, accordingly, foul the various working parts in a manner that would require constant cleaning of the device.

Still another object is to include, in one form of the invention, means for forcing the insects at high speed into a small disposable container, to stun or kill the same and facilitate their disposal.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is an exploded perspective view of an insect catcher according to the invention.

FIG. 2 is an enlarged front end elevational view.

FIG. 3 is an enlarged rear end elevational view.

FIG. 4 is an enlarged perspective view of the air-pervious receiver.

FIG. 5 is an enlarged side elevational view, portions being broken away, of the apparatus with the cover removed.

FIG. 6 is a view like FIG. 5 in which a modified type of receiver or container is used.

Referring to the drawings in detail, the insect catching device, generally designated 10, may be made in various forms, but for the purpose of illustrating the invention has been shown as including a flat, rectangular base 12 on the front end of which is mounted a squirrel-cage blower 14 including a blower housing 16 in which a bladed rotor 18 is mounted on bearings 20, said rotor including a shaft 22 journalled in the bearings and driven by a motor 24 mounted on the base immediately in back of the blower and in longitudinal alignment therewith.

The rotor has a center inlet and is so designed that the insects will be directed radially outwardly thereof with minimum possibility of lodging against and fouling the blades. Further, the insects will not pass along and lodge against the motor, because of their being directed into a horizontal conduit 26 C-shaped to extend around the motor at one side of the base, and supported on an angle bracket 27 carried by the base.

Conduit 26, in back of the motor, has an extension 28 disposed longitudinally and centrally of the base. Frictionally and removably engaging the extension is a cylindrical connecting fitting 30 on the front end of a receiving bag 32 of a collapsible material pervious to the passage of air but not of insects. The bag at its front end receives the fitting 30, which has an outwardly directed inner end flange 34 riveted or otherwise permanently connected at 36 to the front wall of the bag.

The bag at its rear end may be opened to facilitate shaking out insects and to this end has a reduced extension 38 normally closed by a drawstring 40. The bag, when removed from the conduit is opened at its rear end and the insects are shaken out and disposed of.

An elongated, open-bottom casing 42 having a transversely rounded top wall has a front end wall 44 formed with an inlet opening 46 through which insects are drawn into the blower. Casing 42 also has a rear end wall 48 having an opening 50 through which air is discharged after passing through the pervious wall of the bag. A handle 43 on the casing facilitates carrying of the device from place to place.

Depending longitudinal flanges 52 on the side walls of the casing are apertured to register with openings formed in the side edges of the base, to receive screws 54 whereby the casing is connected to the base. An access door 56 is hinged at 58 on the casing and has a handle 60, said door providing access to the bag when the bag is to be removed.

A tube 62 at the front end of the casing has a socket receiving an electric lamp bulb 64, disposed in front of the inlet opening 46. This bulb may be an incandescent or fluorescent bulb. The cord 66 extending from the socket is connectible with a source of electricity, as is the motor. Both may be in circuit with each other, in fact, and controlled by the same switch, not shown. A bracket 68 holds the tube in position on the casing.

In use, the insects are attracted by the light. In the vicinity of the light, they will be entrained in the air stream flowing into the blower and will be thus sucked into the conduit to pass into the bag. They will be trapped in the bag since the mesh of the wall fabric, while allowing air to pass through, is too fine for the passage of even the smallest of insects. Subsequently, the bag may be removed and the insects shaken out.

Instead of a single blower 18, the motor 24 may be provided with a pair of blowers, one on each side of the motor 24.

In FIG. 6, the apparatus is identical to the first form with the following exception: the bag 32 is not used, and instead a cylindrical fitting 70 is removably attached to extension 28. Fitting 70 has a tapered extension receiving at its smaller end the mouth 74 of a small, disposable bag 76 having an air-pervious but insect-retaining wall. A collar 78 is formed on the tapered extension to hold the bag on, cooperating with a drawstring 80 for this purpose.

In this form, the tapered extension causes a progressive increase in air velocity during the flow of the air and insects in the direction of the arrows. As a result, when the insects pass out of the extension into the bag, they are traveling at high speed and striking the wall of the bag, are in many instances stunned or killed outright. In any event, they are forced and held against the rear end wall of the bag, so as not to escape when the bag is detached. The bag may thus merely be detached and drawstring 80 closed, after which the bag 76 and the insects trapped therein are thrown away. The small size and inexpensive construction of the bag permit a single use thereof and the capacity is still sufficient for collection of a substantial mass of insects therein.

Various details of design may, of course, be changed. The door 56 might be at the side, for instance, or the casing left off completely. Other changes, within the scope of the claim, may also be made.

While we have illustrated and described the preferred embodiments of our invention, it is to be understood that we do not limit ourselves to the precise constructions herein disclosed and that various changes and modifications may be made within the scope of the invention as defined in the appended claim.

Having thus described our invention, what we claim as new, and desire to secure by United States Letters Patent is:

An insect catching device comprising a rectangular-shaped base, an air blower supported on the end thereof, said blower having an axial air inlet and lateral air outlet, an electric motor on said base in line with and closely spaced from said air blower, means of connection between the motor and the blower for actuating the blower, a C-shaped air conduit having one end communicating with the lateral outlet of the air blower so that air entering said air inlet by-passes the motor, an extension on the other end of the conduit, a conical-shaped fitting having its large end in overlapping relation with the end of said extension, and an air-pervious insect receiving bag removably supported on the small end of said fitting in line with the air blower and motor, a casing mounted on the base and enclosing the blower, motor, conduit and bag, said casing having an opening at one end thereof in line with the inlet to the blower, a door on said casing in line with the removable bag, and a lamp bulb in the end opening of the casing to attract insects thereto.

References Cited in the file of this patent

UNITED STATES PATENTS

| | | |
|---|---|---|
| 959,155 | Nault | May 24, 1910 |
| 1,165,712 | Rea | Dec. 28, 1915 |
| 1,478,424 | Cross | Dec. 25, 1923 |
| 2,236,698 | Rector | Apr. 1, 1941 |
| 2,780,026 | Dail et al. | Feb. 5, 1957 |
| 2,829,384 | Studler | Apr. 8, 1958 |